United States Patent
Farahani et al.

(10) Patent No.: US 9,950,709 B2
(45) Date of Patent: Apr. 24, 2018

(54) TRANSMISSION RATIO CONTROL SYSTEMS AND METHODS

(71) Applicant: GM Global Technology Operations LLC, Detroit, MI (US)

(72) Inventors: Artin Farahani, Novi, MI (US); Christopher Jay Weingartz, Fenton, MI (US); John E. Marano, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 286 days.

(21) Appl. No.: 14/944,680

(22) Filed: Nov. 18, 2015

(65) Prior Publication Data

US 2017/0137027 A1    May 18, 2017

(51) Int. Cl.
| | |
|---|---|
| *B60W 10/06* | (2006.01) |
| *B60W 10/107* | (2012.01) |
| *B60W 30/188* | (2012.01) |
| *F16H 61/662* | (2006.01) |
| *F16H 59/14* | (2006.01) |
| *F16H 59/24* | (2006.01) |
| *F16H 59/44* | (2006.01) |
| *F16H 61/00* | (2006.01) |

(52) U.S. Cl.
CPC ......... *B60W 30/188* (2013.01); *B60W 10/06* (2013.01); *B60W 10/107* (2013.01); *F16H 61/662* (2013.01); *F16H 61/66259* (2013.01); *B60W 2520/10* (2013.01); *B60W 2540/10* (2013.01); *B60W 2710/1005* (2013.01); *B60W 2720/30* (2013.01); *F16H 59/14* (2013.01); *F16H 59/24* (2013.01); *F16H 59/44* (2013.01); *F16H 2059/148* (2013.01); *F16H 2061/0096* (2013.01)

(58) Field of Classification Search
CPC .. B60W 10/06; B60W 10/107; B60W 30/182; B60W 30/188; B60W 2520/10; B60W 2540/10; B60W 2540/04; B60W 2710/1005
See application file for complete search history.

(56) References Cited

U.S. PATENT DOCUMENTS

| | | | | |
|---|---|---|---|---|
| 2011/0238272 | A1* | 9/2011 | Kato | B60W 10/06 701/55 |
| 2015/0314787 | A1* | 11/2015 | Ono | F02D 11/105 701/110 |

* cited by examiner

*Primary Examiner* — Edwin A Young (57) ABSTRACT

A target ratio module selectively determines a target ratio of transmission input shaft speed to transmission output shaft speed independently of an accelerator pedal position and as a function of a vehicle speed and a driver axle torque request. A first pulley valve control module controls opening of a first valve based on the target ratio. The first valve controls transmission fluid flow to a first pulley actuator. The first pulley actuator is coupled to the transmission input shaft of a continuously variable transmission (CVT) and expands and contracts based on transmission fluid pressure. A second pulley valve control module controls opening of a second valve based on the target ratio. The second valve controls transmission fluid flow to a second pulley actuator. The second pulley actuator is coupled to the transmission output shaft of the CVT and expands and contracts based on transmission fluid pressure.

20 Claims, 6 Drawing Sheets

TRANSMISSION RATIO CONTROL SYSTEMS AND METHODS

FIELD

The present disclosure relates control systems and methods for vehicles and more particularly to systems and methods for controlling a speed ratio of a transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine combusts an air and fuel mixture within cylinders to drive pistons, which produces drive torque. Air flow into the engine may be regulated via a throttle. More specifically, the throttle adjusts throttle area, which increases or decreases air flow into the engine. As the throttle area increases, the air flow into the engine increases. A fuel control system adjusts the rate that fuel is injected to provide a target air/fuel mixture to the cylinders and/or to achieve a target torque output. Increasing the amount of air and fuel provided to the cylinders increases the torque output of the engine.

Some transmission control systems control a plurality of solenoids to shift gears of an automatic transmission. In one example, the transmission control system actuates (e.g., opens) one or more solenoids to shift the transmission to a particular gear. The transmission control system actuates a solenoid by adjusting the pressure in a line that supplies hydraulic fluid to the solenoid. In another example, the transmission control system increases the hydraulic pressure supplied to a solenoid to actuate the solenoid.

Manual transmissions require a driver to actuate a clutch pedal and select a gear ratio using a gear selection lever. The number of gear ratios available to the driver to select in a manual transmission may be five to 7 although a greater or lesser number of gear ratios may be possible. A continuously variable transmission is an automatic transmission that can adjust its gear ratio continuously to a large number of gear ratios between maximum and minimum values.

SUMMARY

In a feature, a transmission control system for a vehicle is disclosed. A target ratio module, in response to a signal being in a first state, determines a target ratio of transmission input shaft speed to transmission output shaft speed independently of an accelerator pedal position and as a function of a vehicle speed and a driver axle torque request. A first pulley valve control module controls opening of a first valve based on the target ratio. The first valve controls transmission fluid flow to a first pulley actuator. The first pulley actuator is coupled to the transmission input shaft of a continuously variable transmission (CVT) and expands and contracts based on a first pressure of the transmission fluid applied to the first pulley actuator. A second pulley valve control module controls opening of a second valve based on the target ratio. The second valve controls transmission fluid flow to a second pulley actuator. The second pulley actuator is coupled to the transmission output shaft of the CVT and expands and contracts based on a second pressure of the transmission fluid applied to the second pulley actuator. One of (i) a belt and (ii) a chain encircles the first and second pulley actuators.

In further features, in response to the signal being in the first state, the target ratio module determines the target ratio as a function of the vehicle speed and the driver axle torque request using a lookup table that relates vehicle speeds and driver axle torque requests to target ratios of transmission input shaft speed to transmission output shaft speed.

In further features, based on a drive mode of the vehicle, the target ratio module selects the lookup table from a plurality of lookup tables for respective drive modes, each of the plurality of lookup tables relating vehicle speeds and driver axle torque requests to target ratios of transmission input shaft speed to transmission output shaft speed.

In further features, in response to the signal being in a second state, the target ratio module determines the target ratio independently of the driver axle torque request and as a function of the vehicle speed and the accelerator pedal position.

In further features, in response to the signal being in the second state, the target ratio module determines the target ratio as a function of the vehicle speed and the accelerator pedal position using a second lookup table that relates vehicle speeds and accelerator pedal positions to target ratios of transmission input shaft speed to transmission output shaft speed.

In further features, based on a drive mode of the vehicle, the target ratio module selects the second lookup table from a plurality of second lookup tables for respective drive modes, each of the plurality of second lookup tables relating vehicle speeds and accelerator pedal positions to target ratios of transmission input shaft speed to transmission output shaft speed.

In further features, the target ratio module determines the target ratio as a function of the vehicle speed and the driver axle torque request in response to determinations that both: the signal is in the first state; and a configuration indicator stored in memory indicates that the vehicle is configured to determine the target ratio as a function of the vehicle speed and the driver axle torque request.

In further features, the target ratio module determines the target ratio independently of the driver axle torque request and as a function of the vehicle speed and the accelerator pedal position in response to a determination that the configuration indicator indicates that the vehicle is not configured to determine the target ratio as a function of the vehicle speed and the driver axle torque request.

In further features, the target ratio module determines the target ratio as a function of the vehicle speed and the driver axle torque request in response to the signal being in the first state for greater than a predetermined period.

In further features, a system of the vehicle includes: an engine control module that determines the driver axle torque request based on the accelerator pedal position, that sets the signal to the first state when the determination of the driver axle torque request is valid, and that controls a plurality of engine actuators based on the driver axle torque request; and the transmission control system.

In a feature, a transmission control method for a vehicle is described. The transmission control method includes: in response to a signal being in a first state, determining a target ratio of transmission input shaft speed to transmission output shaft speed independently of an accelerator pedal position and as a function of a vehicle speed and a driver axle torque request; controlling opening of a first valve based on the target ratio, wherein the first valve controls transmission fluid flow to a first pulley actuator, and wherein the first pulley actuator is coupled to the transmission input shaft of a continuously variable transmission (CVT) and expands and contracts based on a first pressure of the transmission fluid applied to the first pulley actuator; and controlling opening of a second valve based on the target ratio, wherein the second valve controls transmission fluid flow to a second pulley actuator, and wherein the second pulley actuator is coupled to the transmission output shaft of the CVT and expands and contracts based on a second pressure of the transmission fluid applied to the second pulley actuator. One of (i) a belt and (ii) a chain encircles the first and second pulley actuators.

In further features the transmission control method includes, in response to the signal being in the first state, determining the target ratio as a function of the vehicle speed and the driver axle torque request using a lookup table that relates vehicle speeds and driver axle torque requests to target ratios of transmission input shaft speed to transmission output shaft speed.

In further features the transmission control method includes, based on a drive mode of the vehicle, selecting the lookup table from a plurality of lookup tables for respective drive modes, each of the plurality of lookup tables relating vehicle speeds and driver axle torque requests to target ratios of transmission input shaft speed to transmission output shaft speed.

In further features the transmission control method includes, in response to the signal being in a second state, determining the target ratio independently of the driver axle torque request and as a function of the vehicle speed and the accelerator pedal position.

In further features the transmission control method includes, in response to the signal being in the second state, determining the target ratio as a function of the vehicle speed and the accelerator pedal position using a second lookup table that relates vehicle speeds and accelerator pedal positions to target ratios of transmission input shaft speed to transmission output shaft speed.

In further features the transmission control method includes, based on a drive mode of the vehicle, selecting the second lookup table from a plurality of second lookup tables for respective drive modes, each of the plurality of second lookup tables relating vehicle speeds and accelerator pedal positions to target ratios of transmission input shaft speed to transmission output shaft speed.

In further features the transmission control method includes determining the target ratio as a function of the vehicle speed and the driver axle torque request in response to determinations that both: the signal is in the first state; and a configuration indicator stored in memory indicates that the vehicle is configured to determine the target ratio as a function of the vehicle speed and the driver axle torque request.

In further features the transmission control method includes determining the target ratio independently of the driver axle torque request and as a function of the vehicle speed and the accelerator pedal position in response to a determination that the configuration indicator indicates that the vehicle is not configured to determine the target ratio as a function of the vehicle speed and the driver axle torque request.

In further features the transmission control method includes determining the target ratio as a function of the vehicle speed and the driver axle torque request in response to the signal being in the first state for greater than a predetermined period.

In further features a control method for the vehicle includes: the transmission control method; determining the driver axle torque request based on the accelerator pedal position; setting the signal to the first state when the determination of the driver axle torque request is valid; and controlling a plurality of engine actuators based on the driver axle torque request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some vehicles may include an internal combustion engine and/or one or more electric motors or motor generator units. Torque output by an engine and/or one or more electric motors is transferred to a driveline via a transmission. The transmission may be a continuously variable transmission (CVT). According to the present disclosure, a control module, such as a transmission control module, controls the transmission based on a target ratio of transmission input shaft speed to transmission output shaft speed. The control module determines the target ratio based on a vehicle speed and an axle torque request when the axle torque request is valid. When the axle torque is not valid, the control module determines the target ratio based on the vehicle speed and an accelerator pedal position.

Figure 1A:
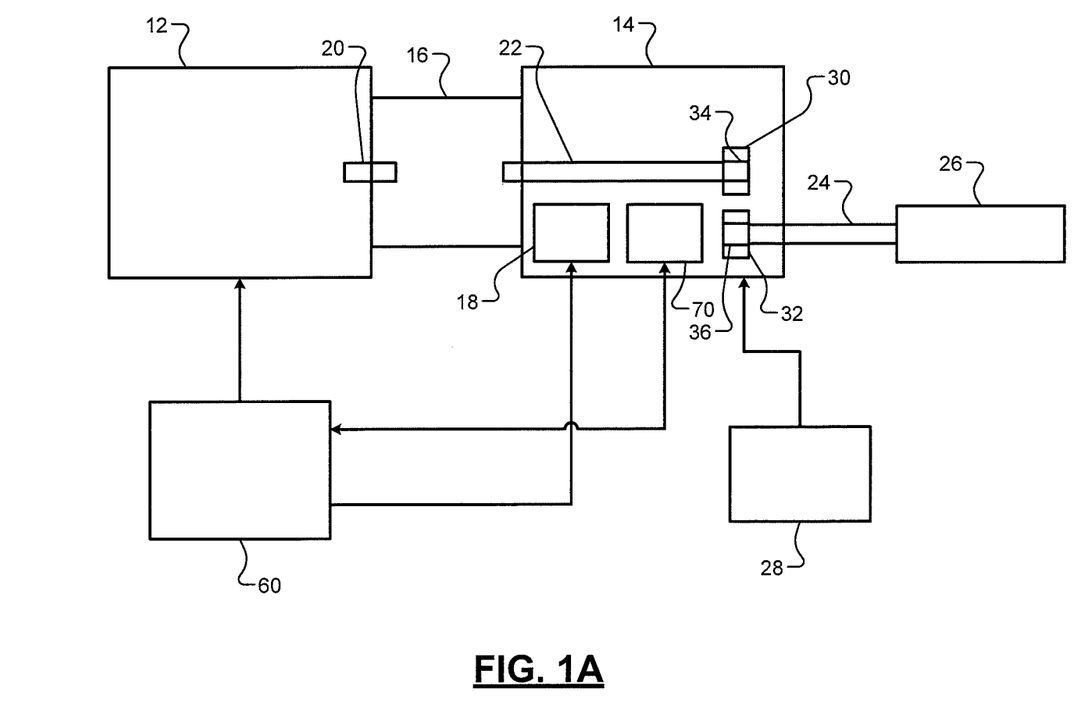
FIGS. 1A-1B are functional block diagrams of an example vehicle system.
Figure 1B:
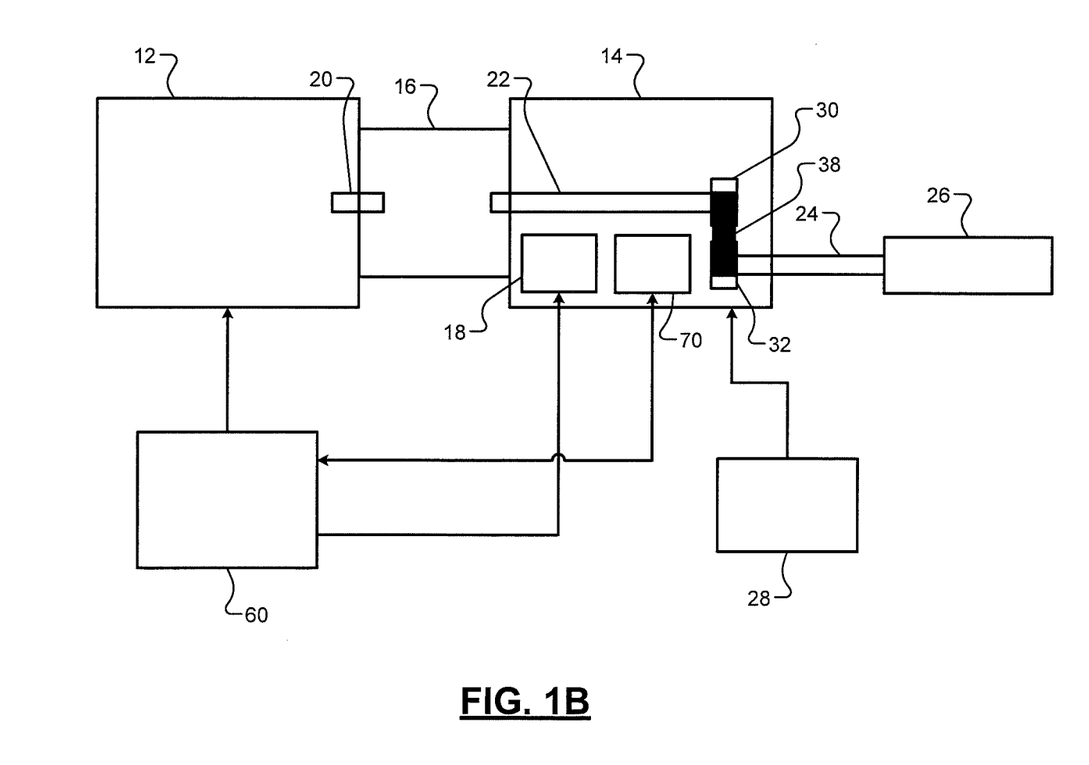

FIGS. 1A and 1B include functional block diagrams of an example vehicle system. An internal combustion engine 12 drives a transmission 14 via a torque converter 16. The engine 12 may include, for example, a spark-ignition engine, a compression-ignition engine, or another suitable type of engine. A vehicle may also include one or more electric motors and/or motor generator unit (MGUs), such as MGU 18.

The engine 12 outputs torque to the torque converter 16 via an engine output shaft 20, such as a crankshaft. The torque converter 16 supplies torque to the transmission 14 via a transmission input shaft 22. The electric motor(s) and/or MGU(s) may also output torque to the transmission input shaft 22 to supplement or replace engine torque output. A MGU may convert mechanical energy into electrical energy under some circumstances, for example, to recharge one or more batteries and/or to supply power for electronic components of the vehicle.

The transmission 14 transfers torque between the transmission input shaft 22 and a transmission output shaft 24. A drive ratio may refer to or be based on the ratio between the rotational speed of the transmission input shaft 22 and the rotational speed of the transmission output shaft 24. The transmission output shaft 24 drives a driveline 26, and the driveline 26 transfers torque to wheels (not shown) of the vehicle. A range selector 28 enables a user to select a mode of operation of the transmission 14. The mode may include, for example, a park mode, a reverse mode, a neutral mode, or one or more forward drive modes.

The transmission 14 is a continuously variable transmission (CVT). A primary pulley 30 is coupled to and rotates with the transmission input shaft 22. A secondary pulley 32 is coupled to and rotates with the transmission output shaft 24. The primary pulley 30 includes a primary pulley actuator 34 that expands and contracts based on a pressure of transmission fluid applied to the primary pulley actuator 34. The secondary pulley 32 includes a secondary pulley actuator 36 that expands and contracts based on a pressure of transmission fluid applied to the secondary pulley actuator 36.

As shown in FIG. 1B, a belt or chain 38 encircles the primary and secondary pulleys 30 and 32 to link rotation of the transmission input shaft 22 and the transmission output shaft 24. Expansion and contraction of the primary and secondary pulley actuators 34 and 36 vary the rotation ratio between the transmission input shaft 22 and the transmission output shaft 24.

An engine control module (ECM) 60 controls operation of the engine 12. The ECM 60 or another control module (not shown) may control operation of one or more electric motors and/or MGUs in various implementations. A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data.

Figure 2:
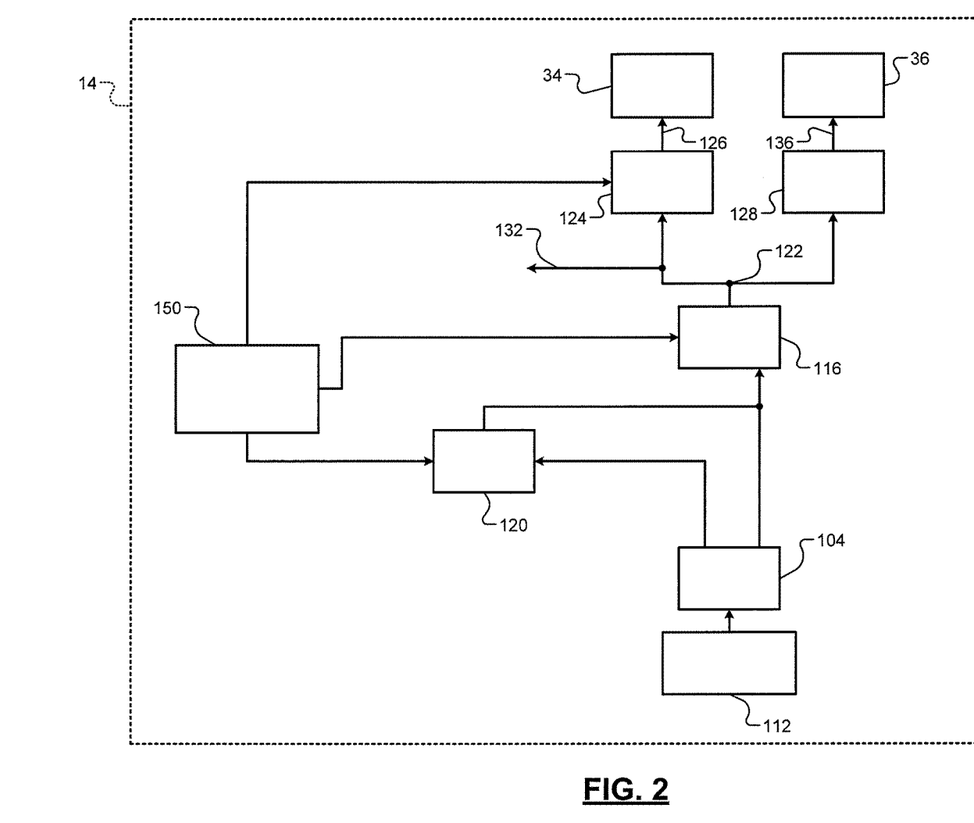
FIG. 2 is a functional block diagram of an example continuously variable transmission (CVT) system.

Referring now to FIG. 2, a functional block diagram of an example implementation of a CVT system is presented. The CVT 14 includes a transmission fluid pump 104 that draws transmission fluid from a sump 112 or another suitable transmission fluid source. The transmission fluid pump 104 is mechanically driven by the engine 12, such as by rotation of the crankshaft 20 or the transmission input shaft 22.

The transmission fluid pump 104 outputs the transmission fluid to a pressure regulator valve 116 via a first fluid path. The transmission fluid pump 104 also outputs the transmission fluid to a switching valve 120 via a second fluid path. When the switching valve 120 is open, the transmission fluid flows from the transmission fluid pump 104 through the switching valve 120 to the pressure regulator valve 116. In various implementations, the switching valve 120 may be integrated within the transmission fluid pump 104.

The pressure regulator valve 116 regulates the flow of the transmission fluid to a primary pulley valve 124, a secondary pulley valve 128, and/or for one or more other actuators/functions 132. The other actuators and/or functions 132 may include, for example, the torque converter 16 (e.g., clutch), one or more variable bleed solenoid (VBS) valves that regulate transmission fluid flow back to the sump 112, cooling of the CVT 14, and/or lubrication of components of the CVT 14. An output pressure of the pressure regulator valve 116 may be referred to as a line pressure 122.

The primary pulley valve 124 regulates the flow (and pressure) of the transmission fluid to the primary pulley actuator 34. For example, the primary pulley valve 124 may be opened to increase the flow of the transmission fluid to the primary pulley actuator 34 and expand the primary pulley actuator 34. The primary pulley valve 124 may be closed to decrease the flow of the transmission fluid to the primary pulley actuator 34 and contract the primary pulley actuator 34. An output pressure of the primary pulley valve 124 may be referred to as a primary pulley pressure 126

The secondary pulley valve 128 regulates the flow (and pressure) of the transmission fluid to the secondary pulley actuator 36. For example, the secondary pulley valve 128 may be opened to increase the flow of the transmission fluid to the secondary pulley actuator 36 and expand the secondary pulley actuator 36. The secondary pulley valve 128 may be closed to decrease the flow of the transmission fluid to the secondary pulley actuator 36 and contract the secondary pulley actuator 36. An output pressure of the secondary pulley valve 128 may be referred to as a secondary pulley pressure 136. Respective VBS valves (not shown) may, for example, regulate flow of the transmission fluid from the primary and secondary pulley actuators 34 and 36 back to the sump 112.

A fluid control module 150 controls actuation of the switching valve 120, the pressure regulator valve 116, the primary pulley valve 124, and the secondary pulley valve 128. Generally speaking, the fluid control module 150 actuates the switching valve 120 to one of two discrete positions at a given time: an open position; or a closed position. The fluid control module 150 transitions the switching valve 120 between the two discrete positions under some circumstances.

When the switching valve 120 is in the closed position, the transmission fluid pump 104 operates in a partial (e.g., half) mode operation. The switching valve 120 blocks transmission fluid flow through the second fluid path when in the closed position, so the transmission fluid pump 104 pumps transmission fluid to the pressure regulator valve 116 only through the first fluid path. Since the transmission fluid pump 104 is driven by the engine 12, a fuel efficiency increase (i.e., a fuel consumption decrease) of the engine 12 may be realized (relative to full mode operation) during operation in the partial mode as the transmission fluid pump 104 imposes a lesser torque load on the engine 12. In various implementations, the switching valve 120 may be omitted, and the transmission fluid pump 104 pumps transmission fluid to the pressure regulator valve 116 only through the first fluid path.

When the switching valve 120 is in the open position, the transmission fluid pump 104 operates in a full mode operation. The switching valve 120 enables transmission fluid flow through the second fluid path when in the open position, so the transmission fluid pump 104 pumps transmission fluid to the pressure regulator valve 116 through both of the first and second fluid paths.

The fluid control module 150 may transition the switching valve 120 from the closed position to the open position, under various circumstances. For example only, the fluid control module 150 may transition the switching valve 120 from the closed position to the open position when a change in a target ratio between the input and output shafts 22 and 24 is greater than a predetermined value.

Figure 3:
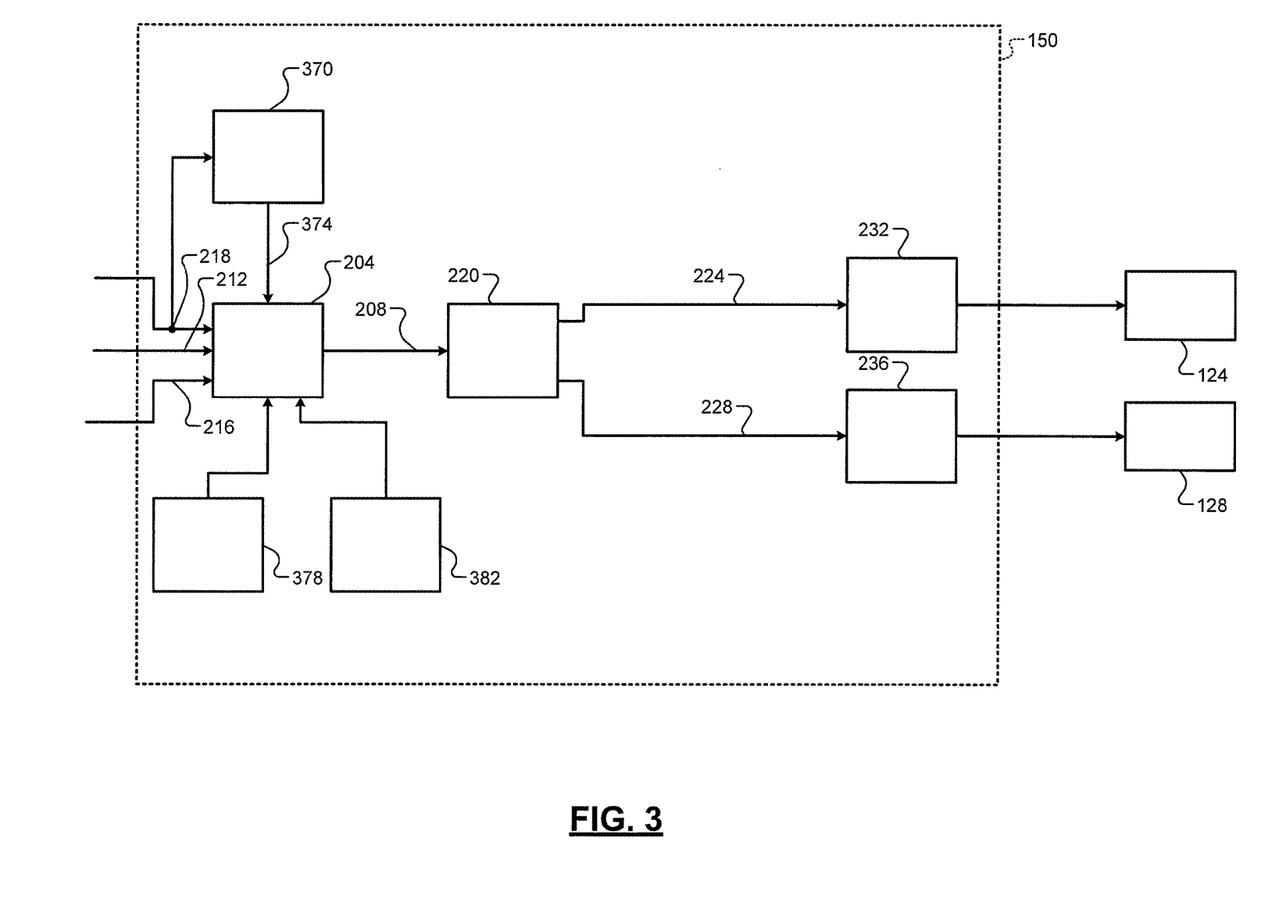
FIG. 3 is a functional block diagram of an example transmission fluid control system.

Referring now to FIG. 3, a functional block diagram of an example transmission fluid control system is presented. The fluid control module 150 may be implemented independently, within the TCM 70, or within another suitable module.

A target ratio module 204 determines a target ratio 208 (between the input and output shafts 22 and 24) to be achieved using the primary and secondary pulley actuators 34 and 36. As discussed further below, the target ratio module 204 determines the target ratio 208 based on either: an accelerator pedal position (APP) 212 and a vehicle speed 216 (and independent of a driver axle torque request 218); or the driver axle torque request 218 and the vehicle speed 216 (and independent of the APP 212.

A target pressure module 220 determines a target primary pulley pressure 224 and a target secondary pulley pressure 228 based on the target ratio 208. The target primary pulley pressure 224 corresponds to a target value of the primary pulley pressure 126. The target secondary pulley pressure 228 corresponds to a target value of the secondary pulley pressure 136. The target pressure module 220 may determine the target primary pulley pressure 224 and the target secondary pulley pressure 228, for example, using one or more look up tables or functions that relate the target ratio 208 to the target primary pulley pressure 224 and the target secondary pulley pressure 228.

A primary valve control module 232 controls opening of the primary pulley valve 124 based on the target primary pulley pressure 224. The primary valve control module 232 may control the opening of the primary pulley valve 124, for example, in closed loop based on a difference between the target primary pulley pressure 224 and a measured or estimated value of the primary pulley pressure 126. For example, the primary valve control module 232 may open the primary pulley valve 124 as the target primary pulley pressure 224 increases, and vice versa, under some circumstances.

A secondary valve control module 236 controls opening of the secondary pulley valve 128 based on the target secondary pulley pressure 228. The secondary valve control module 236 may control the opening of the secondary pulley valve 128, for example, in closed loop based on a difference between the target secondary pulley pressure 228 and a measured or estimated value of the secondary pulley pressure 136. For example, the secondary valve control module 236 may open the secondary pulley valve 128 as the target secondary pulley pressure 228 increases, and vice versa, under some circumstances. The fluid control module 150 may also control actuation of the pressure regulator valve 116, actuation of the switching valve 120, the transmission fluid pump 104, and/or one or more other actuators of a transmission.

Figure 4:
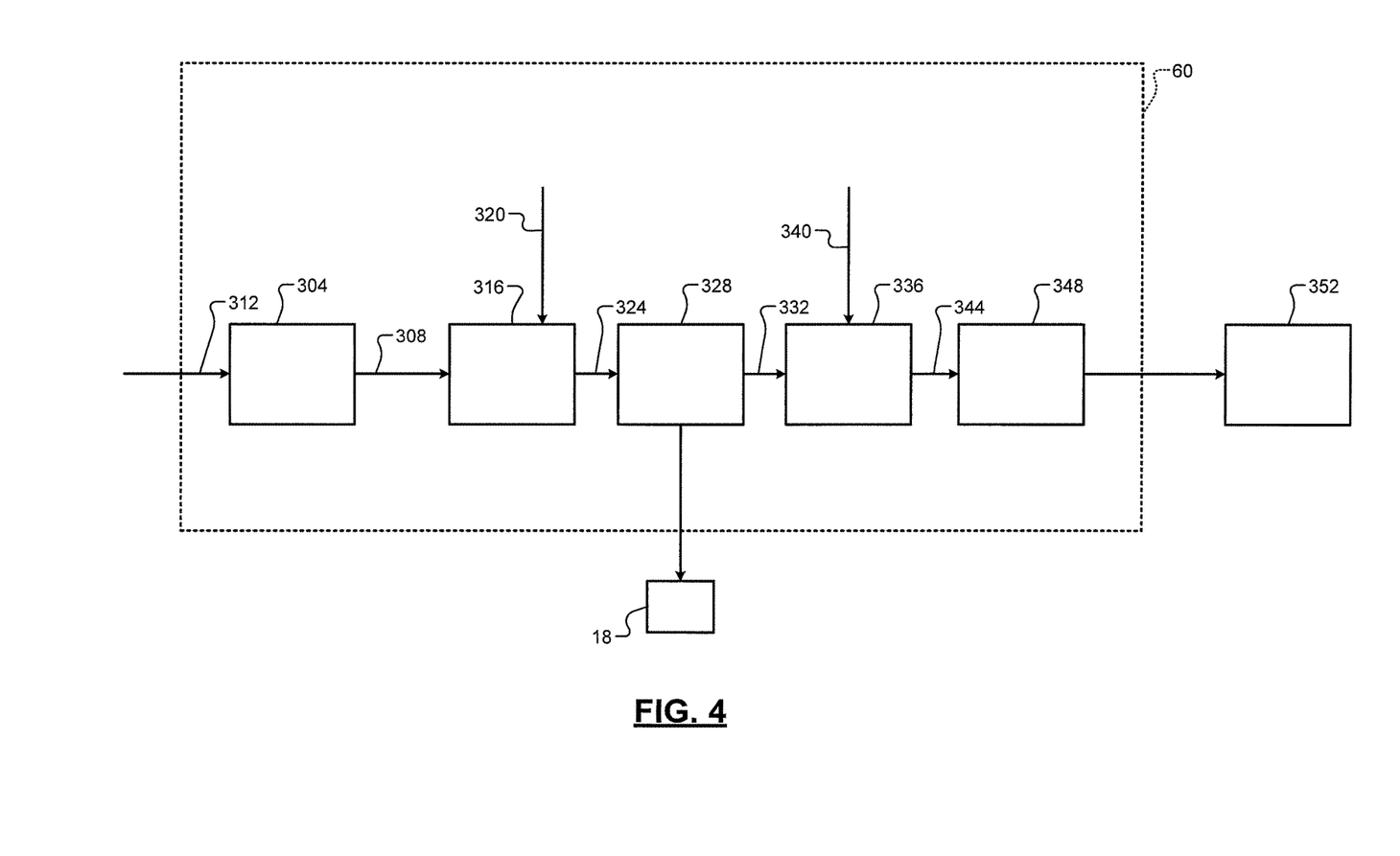
FIG. 4 is a functional block diagram of an example engine control system.

FIG. 4 includes a functional block diagram of an example engine control system. The ECM 60 includes a driver torque module 304 that determines a driver torque request 308 based on driver input 312. The driver input 312 may include, for example, the APP 212, a brake pedal position (BPP), and/or cruise control input. The driver torque module 304 determine the driver torque request 308 based on one or more lookup tables that relate the driver inputs to driver torque requests.

The driver torque request 308 is an axle torque request. Axle torques (including axle torque requests) refer to torque at the wheels. As discussed further below, propulsion torques (including propulsion torque requests) are different than axle torques in that propulsion torques refer to torque at the crankshaft.

An axle torque arbitration module 316 arbitrates between the driver torque request 308 and other axle torque requests 320. Axle torque (torque at the wheels) may be produced by various sources including the engine 12 and/or one or more MGUs, such as MGU 18. Examples of the other axle torque requests 320 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle over-speed torque requests to reduce the axle torque to prevent the vehicle from exceeding a predetermined speed. The axle torque arbitration module 316 outputs one or more axle torque requests 324 based on the results of arbitrating between the received axle torque requests 308 and 320.

A hybrid control module 328 may determine how much torque should be produced by the engine 12 and how much torque should be produced by the MGU(s). The hybrid control module 328 outputs one or more torque requests 332 to a propulsion torque arbitration module 336. The torque requests 332 indicate how much torque should be produced by the engine 12. While the hybrid control module 328 is shown as being implemented within the ECM 60, the hybrid control module 328 may be implemented externally to the ECM 60 in various hybrid vehicle systems. The hybrid control module 328 may be omitted in non-hybrid vehicles.

The propulsion torque arbitration module 336 converts the torque requests 332 from an axle torque domain (torque at the wheels) into a propulsion torque domain (torque at the crankshaft). The propulsion torque arbitration module 336 arbitrates the converted torque requests with other propulsion torque requests 340. Examples of the other propulsion torque requests 340 include, but are not limited to, torque reductions requested for engine over-speed protection and torque increases requested for stall prevention. The propulsion torque arbitration module 336 outputs one or more propulsion torque requests 344 to an actuator control module 348 as a result of the arbitration.

The actuator control module 348 controls one or more actuators 352 of the engine 12 based on the prolusion torque requests 344. For example, based on the propulsion torque requests 344, the actuator control module 348 may control opening of a throttle valve, timing of spark provided by spark plugs, timing and amount of fuel injected by fuel injectors, cylinder actuation/deactivation devices, intake and exhaust valve phasers, one or more boost devices (e.g., turbochargers, superchargers, etc.), an exhaust gas recirculation (EGR) valve, and/or one or more other engine actuators.

Referring back to FIG. 3, the fluid control module 150 also includes a selection module 370. The selection module 370 determines whether the driver axle torque request 218 is valid. For example only, the driver axle torque request 218 may be the driver torque request 308.

The driver axle torque request 218 is received from the ECM 60 over a car area network (CAN) bus (not shown). Along with (or within) the driver axle torque request 218, the ECM 60 transmits a validity signal. The ECM 60 sets the validity signal to indicate that the driver axle torque request 218 is valid when the ECM 60 has appropriately determined the driver axle torque request 218, no errors have been diagnosed in one or more components (e.g., APP sensor, BPP sensors, the lookup table, etc.) used to determine the driver axle torque request 218, and/or one or more other conditions for the driver axle torque request 218 being valid are satisfied. The ECM 60 sets the validity signal to indicate that the driver axle torque request 218 is invalid when one or more conditions for the driver axle torque request 218 being valid are not satisfied.

The selection module 370 determines whether the driver axle torque request 218 is valid based on the validity signal. For example, the selection module 370 determines that the driver axle torque request 218 is valid when the validity signal indicates that the driver axle torque request 218 is valid. The selection module 370 determines that the driver axle torque request 218 is invalid when the validity signal indicates that the driver axle torque request 218 is invalid.

The selection module 370 also determines whether the vehicle is calibrated to allow determination of the target ratio 208 based on driver axle torque requests. For example, the selection module 370 may determine whether a calibration indicator stored in memory indicates that the vehicle is calibrated to allow determination of the target ratio 208 based on driver axle torque requests. The calibration indicator may be stored, for example, by a vehicle manufacturer before the vehicle is made available for driving.

The selection module 370 generates a selection signal 374 signal based on whether (i) the driver axle torque request 218 is valid and (ii) the vehicle is calibrated to allow determination of the target ratio 208 based on driver axle torque requests. For example, the selection module 370 may set the selection signal 374 to a first state when the driver axle torque request 218 is valid and the vehicle is calibrated to allow determination of the target ratio 208 based on driver axle torque requests. The selection module 370 may set the selection signal 374 to a second state when at least one of: (i) the driver axle torque request 218 is invalid; and (ii) the vehicle is not calibrated to allow determination of the target ratio 208 based on driver axle torque requests. When the selection signal 374 is in the second state and the vehicle is calibrated to allow determination of the target ratio 208 based on driver axle torque requests, the selection module 370 may transition the selection signal 374 to the first state when the driver axle torque request 218 is valid for at least a predetermined period. This may prevent frequent transitions of the selection signal 374 from the second state to the first state. The fluid control module 150 will transition from the use of the driver axle torque request 218 to the use of the APP 212 in a manner that is consistent with the configured control strategy of the fluid control module 150. If step changes are allowed, a step change from one ratio to another may be commanded. Otherwise, a continuous ratio change may be commanded. One example strategy where step changes may be allowed is a tap mode where a driver may command step changes (upshifts and downshifts).

Based on the selection signal 374, the target ratio module 204 selects either: the APP 212 and the vehicle speed 216; or the driver axle torque request 218 and the vehicle speed 216. For example, the target ratio module 204 selects the driver axle torque request 218 and the vehicle speed 216 when the selection signal 374 is in the first state. The target ratio module 204 selects the APP 212 and the vehicle speed 216 when the selection signal 374 is in the second state.

When the selection signal 374 is in the first state, the target ratio module 204 determines the target ratio 208 based on the driver axle torque request 218 and the vehicle speed 216 using a first lookup table 378 stored in memory. The first lookup table 378 may be a three-dimensional mapping that relates driver axle torque requests and vehicle speeds to target ratios. When the selection signal 374 is in the second state, the target ratio module 204 determines the target ratio 208 based on the APP 212 and the vehicle speed 216 using a second lookup table 382 stored in memory. The second lookup table 382 may be a three-dimensional mapping that relates APPs and vehicle speeds to target ratios. The target ratio module 204 may use interpolation for values between entries of the first or second lookup tables 378 or 382.

In various implementations, multiple instances of the first lookup table 378 may be stored for different driving modes, such as normal, sawtooth, detent, tap, manual, sport, and/or winter. Multiple instances of the second lookup table 382 may also be stored for the different driving modes. The target ratio module 204 may select one of the instances of the selected one of the lookup tables based on the driving mode.

Figure 5:
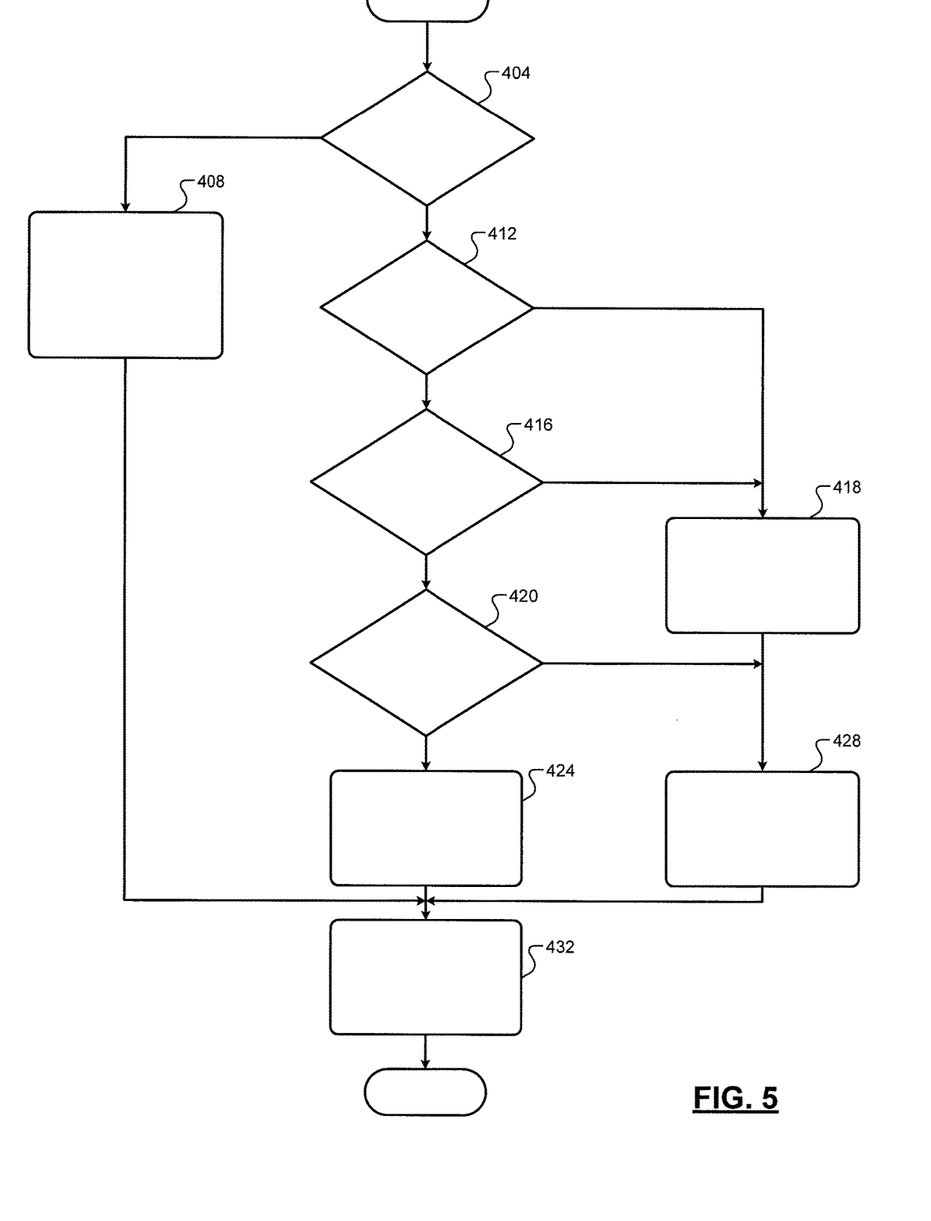
FIG. 5 is a flowchart depicting an example method of controlling a ratio of transmission input shaft speed to transmission output shaft speed of a transmission.

Referring now to FIG. 5, a flowchart depicting an example method of controlling the transmission 14 is presented. Control may begin with 404, where the selection module 370 determines whether the controller area network (CAN) communication of the driver axle torque request 218 was successful. If 404 is true, control may determine a transmission ratio based on a predetermined axle torque at 408, and control continues with 432, which is discussed further below. If 404 is false, control may continue with 412.

At 412, the selection module 370 determines whether the driver axle torque request 218 is valid. For example, the selection module 370 may determine whether the validity signal indicates that the driver axle torque request 218 is valid. If 412 is true, control continues with 416. If 412 is false, the selection module 370 sets the selection signal 374 to the second state and resets a timer at 418, and control continues with 428, which is discussed further below.

The selection module 370 determines whether the vehicle is calibrated to allow determination of the target ratio 208 based on driver axle torque requests at 416. For example, the selection module 370 may determine whether the calibration indicator stored in memory indicates that the vehicle is calibrated to allow determination of the target ratio 208 based on driver axle torque requests. If 416 is true, control continues with 420. If 416 is false, the selection module 370 sets the selection signal 374 to the second state and resets the timer at 418, and control continues with 428. The timer therefore tracks a timer period since the target ratio 208 began being determined based on the APP 212 and the vehicle speed 216 due to at least one of: the vehicle not being calibrated to allow determination of the target ratio 208 based on driver axle torque requests; and the driver axle torque request 218 being invalid.

At 420, the selection module 370 may determine whether the timer period tracked by the timer is greater than a predetermined period. If 420 is false, the selection module 370 allows the timer to continue incrementing, sets the selection signal 374 to the second state, and control continues with 428. If 420 is true, the selection module 370 sets the selection signal 374 to the first state, and control continues with 424. The comparison of the timer period with the predetermined period may prevent frequent transitions from use of the APP 212 and the vehicle speed 216 to use of the driver axle torque request 218 and the vehicle speed 216.

At 424, based on the selection signal 374 being in the first state, the target ratio module 204 determines the target ratio 208 based on the driver axle torque request 218 and the vehicle speed 216 using the first lookup table 378. The target ratio module 204 may also select one instance of the first lookup table 378 at 424 based on the present driving mode. As described above, the first lookup table 378 maps driver axle torque requests and vehicle speeds to target ratios.

At 428, based on the selection signal 374 being in the second state, the target ratio module 204 determines the target ratio 208 based on the APP 212 and the vehicle speed 216 using the second lookup table 382. The target ratio module 204 may also select one instance of the second lookup table 382 at 428 based on the present driving mode.

As described above, the second lookup table 382 maps APPs and vehicle speeds to target ratios. Control continues with 432 after 408, 424, or 428.

At 432, transmission actuators are controlled to achieve the target ratio 208 of transmission input shaft speed to transmission output shaft speed. For example, the target pressure module 220 may determine the target primary pulley pressure 224 and the target secondary pulley pressure 228 based on the target ratio 208. The primary valve control module 232 may control opening of the primary pulley valve 124 based on the target primary pulley pressure 224. The secondary valve control module 236 may control opening of the secondary pulley valve 128 based on the target secondary pulley pressure 228. While FIG. 5 is illustrated as ending after 432, the example of FIG. 5 illustrates one control loop, and a control loop may be started every predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv)

source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A transmission control system for a vehicle, comprising:
    a target ratio module that, in response to a signal being in a first state, determines a target ratio of transmission input shaft speed to transmission output shaft speed independently of an accelerator pedal position and as a function of a vehicle speed and a driver axle torque request;
    a first pulley valve control module that controls opening of a first valve based on the target ratio, wherein the first valve controls transmission fluid flow to a first pulley actuator, and wherein the first pulley actuator is coupled to the transmission input shaft of a continuously variable transmission (CVT) and expands and contracts based on a first pressure of the transmission fluid applied to the first pulley actuator; and
    a second pulley valve control module that controls opening of a second valve based on the target ratio, wherein the second valve controls transmission fluid flow to a second pulley actuator, and wherein the second pulley actuator is coupled to the transmission output shaft of the CVT and expands and contracts based on a second pressure of the transmission fluid applied to the second pulley actuator, and
    wherein one of (i) a belt and (ii) a chain encircles the first and second pulley actuators.

2. The transmission control system of claim 1 wherein, in response to the signal being in the first state, the target ratio module determines the target ratio as a function of the vehicle speed and the driver axle torque request using a lookup table that relates vehicle speeds and driver axle torque requests to target ratios of transmission input shaft speed to transmission output shaft speed.

3. The transmission control system of claim 2 wherein, based on a drive mode of the vehicle, the target ratio module selects the lookup table from a plurality of lookup tables for respective drive modes, each of the plurality of lookup tables relating vehicle speeds and driver axle torque requests to target ratios of transmission input shaft speed to transmission output shaft speed.

4. The transmission control system of claim 2 wherein, in response to the signal being in a second state, the target ratio module determines the target ratio independently of the driver axle torque request and as a function of the vehicle speed and the accelerator pedal position.

5. The transmission control system of claim 4 wherein, in response to the signal being in the second state, the target ratio module determines the target ratio as a function of the vehicle speed and the accelerator pedal position using a second lookup table that relates vehicle speeds and accelerator pedal positions to target ratios of transmission input shaft speed to transmission output shaft speed.

6. The transmission control system of claim 5 wherein, based on a drive mode of the vehicle, the target ratio module selects the second lookup table from a plurality of second lookup tables for respective drive modes, each of the plurality of second lookup tables relating vehicle speeds and accelerator pedal positions to target ratios of transmission input shaft speed to transmission output shaft speed.

7. The transmission control system of claim 1 wherein the target ratio module determines the target ratio as a function of the vehicle speed and the driver axle torque request in response to determinations that both: the signal is in the first state; and a configuration indicator stored in memory indicates that the vehicle is configured to determine the target ratio as a function of the vehicle speed and the driver axle torque request.

8. The transmission control system of claim 7 wherein the target ratio module determines the target ratio independently of the driver axle torque request and as a function of the vehicle speed and the accelerator pedal position in response to a determination that the configuration indicator indicates that the vehicle is not configured to determine the target ratio as a function of the vehicle speed and the driver axle torque request.

9. The transmission control system of claim 1 wherein the target ratio module determines the target ratio as a function of the vehicle speed and the driver axle torque request in response to the signal being in the first state for greater than a predetermined period.

10. A system of the vehicle, comprising:
    an engine control module that determines the driver axle torque request based on the accelerator pedal position, that sets the signal to the first state when the determination of the driver axle torque request is valid, and that controls a plurality of engine actuators based on the driver axle torque request; and
    the transmission control system of claim 1.

11. A transmission control method for a vehicle, comprising:
    in response to a signal being in a first state, determining a target ratio of transmission input shaft speed to transmission output shaft speed independently of an accelerator pedal position and as a function of a vehicle speed and a driver axle torque request;
    controlling opening of a first valve based on the target ratio, wherein the first valve controls transmission fluid flow to a first pulley actuator, and wherein the first pulley actuator is coupled to the transmission input shaft of a continuously variable transmission (CVT) and expands and contracts based on a first pressure of the transmission fluid applied to the first pulley actuator; and
    controlling opening of a second valve based on the target ratio, wherein the second valve controls transmission fluid flow to a second pulley actuator, and wherein the second pulley actuator is coupled to the transmission output shaft of the CVT and expands and contracts based on a second pressure of the transmission fluid applied to the second pulley actuator, and
    wherein one of (i) a belt and (ii) a chain encircles the first and second pulley actuators.

12. The transmission control method of claim 11 further comprising, in response to the signal being in the first state, determining the target ratio as a function of the vehicle speed and the driver axle torque request using a lookup table that relates vehicle speeds and driver axle torque requests to target ratios of transmission input shaft speed to transmission output shaft speed.

13. The transmission control method of claim 12 further comprising, based on a drive mode of the vehicle, selecting the lookup table from a plurality of lookup tables for respective drive modes, each of the plurality of lookup tables relating vehicle speeds and driver axle torque requests to target ratios of transmission input shaft speed to transmission output shaft speed.

14. The transmission control method of claim 12 further comprising, in response to the signal being in a second state, determining the target ratio independently of the driver axle torque request and as a function of the vehicle speed and the accelerator pedal position.

15. The transmission control method of claim 14 further comprising, in response to the signal being in the second state, determining the target ratio as a function of the vehicle speed and the accelerator pedal position using a second lookup table that relates vehicle speeds and accelerator pedal positions to target ratios of transmission input shaft speed to transmission output shaft speed.

16. The transmission control method of claim 15 further comprising, based on a drive mode of the vehicle, selecting the second lookup table from a plurality of second lookup tables for respective drive modes, each of the plurality of second lookup tables relating vehicle speeds and accelerator pedal positions to target ratios of transmission input shaft speed to transmission output shaft speed.

17. The transmission control method of claim 11 further comprising determining the target ratio as a function of the vehicle speed and the driver axle torque request in response to determinations that both: the signal is in the first state; and a configuration indicator stored in memory indicates that the vehicle is configured to determine the target ratio as a function of the vehicle speed and the driver axle torque request.

18. The transmission control method of claim 17 further comprising determining the target ratio independently of the driver axle torque request and as a function of the vehicle speed and the accelerator pedal position in response to a determination that the configuration indicator indicates that the vehicle is not configured to determine the target ratio as a function of the vehicle speed and the driver axle torque request.

19. The transmission control method of claim 11 further comprising determining the target ratio as a function of the vehicle speed and the driver axle torque request in response to the signal being in the first state for greater than a predetermined period.

20. A control method for the vehicle, comprising:
the transmission control method of claim 11;
determining, by an engine control module, the driver axle torque request based on the accelerator pedal position;
setting, by the engine control module, the signal to the first state when the determination of the driver axle torque request is valid; and
controlling, by the engine control module, a plurality of engine actuators based on the driver axle torque request.

* * * * *